No. 677,747. Patented July 2, 1901.
A. A. E. STERZING.
WINDMILL.
(Application filed Aug. 2, 1898.)
(No Model.) 8 Sheets—Sheet 1.

WITNESSES:
INVENTOR
Albert A. E. Sterzing
BY
ATTORNEY

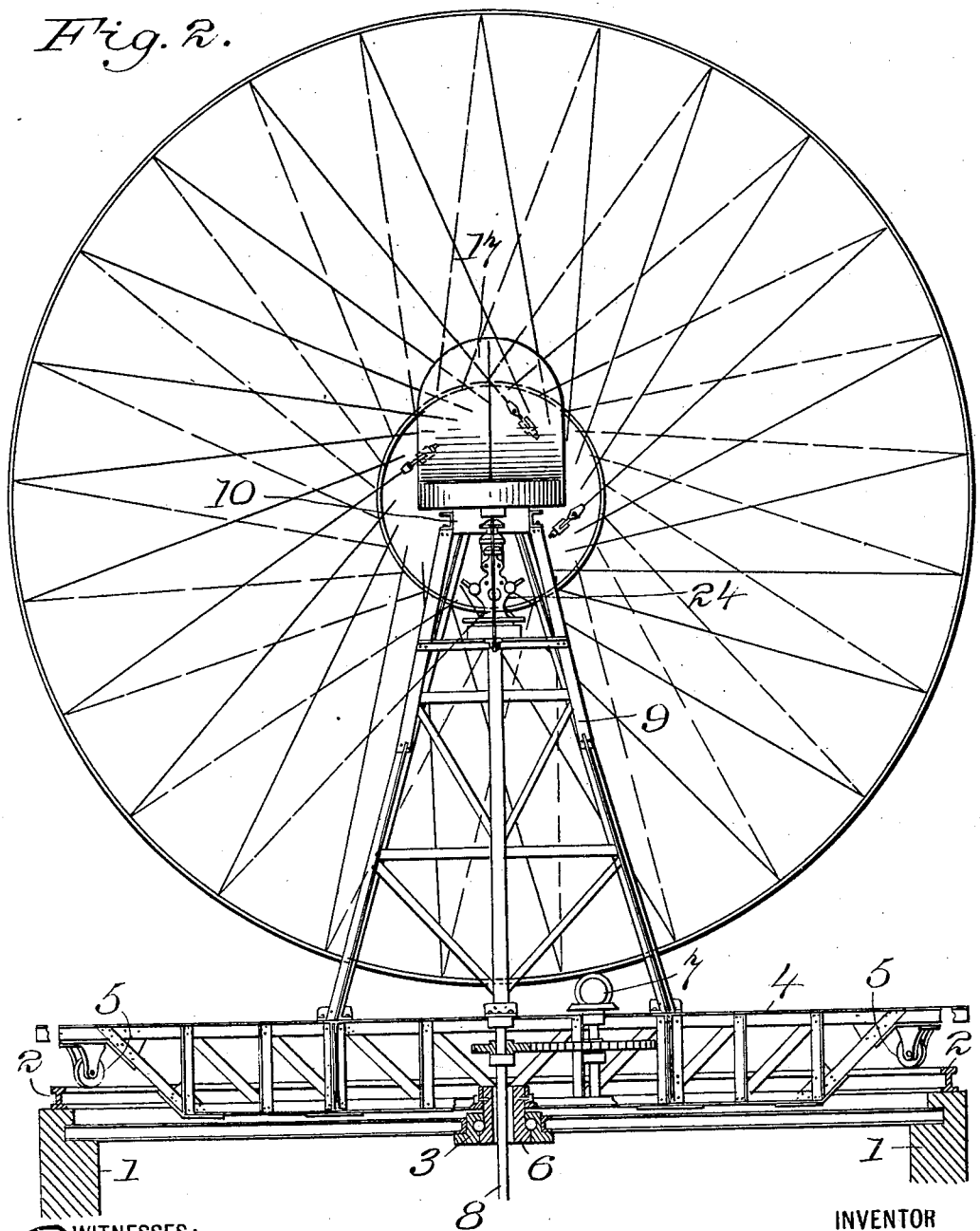

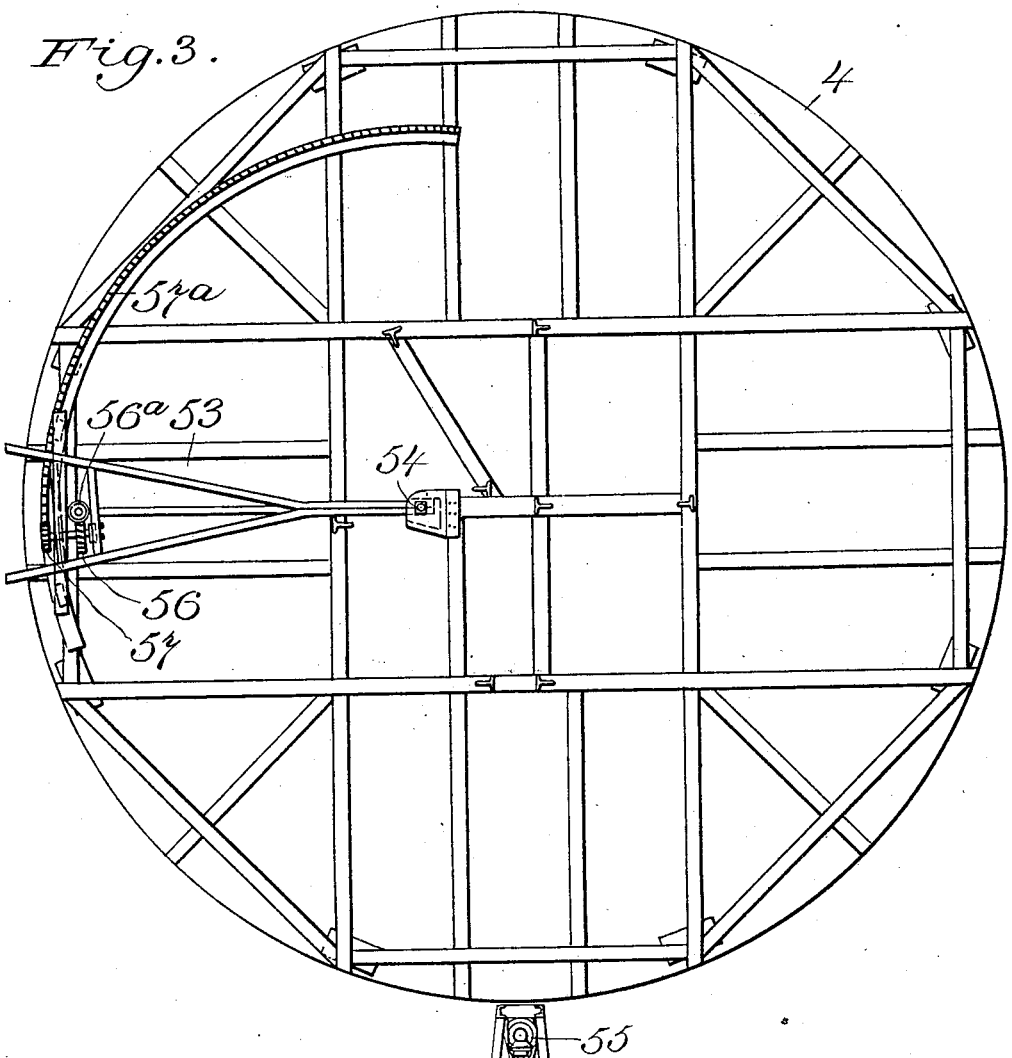

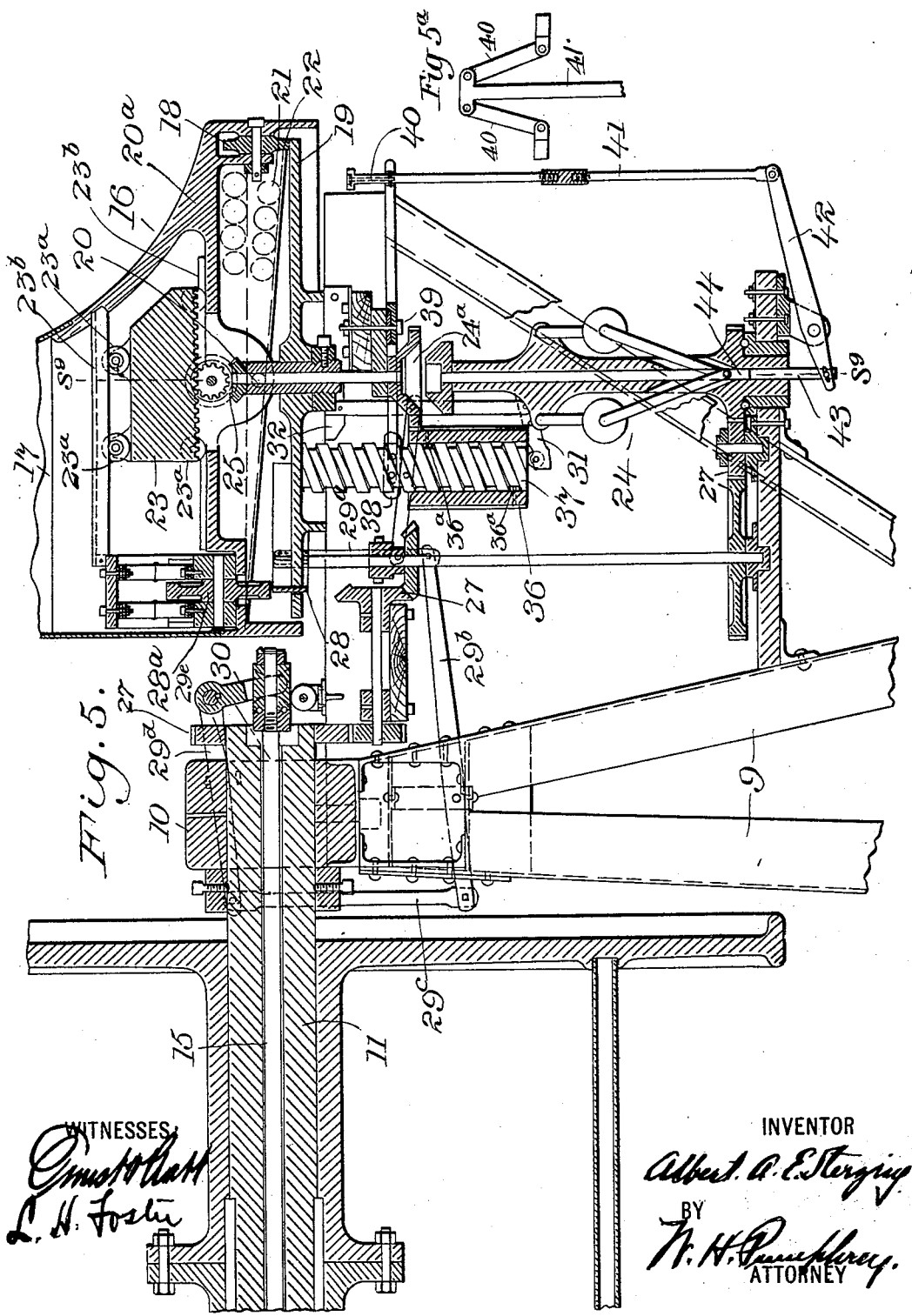

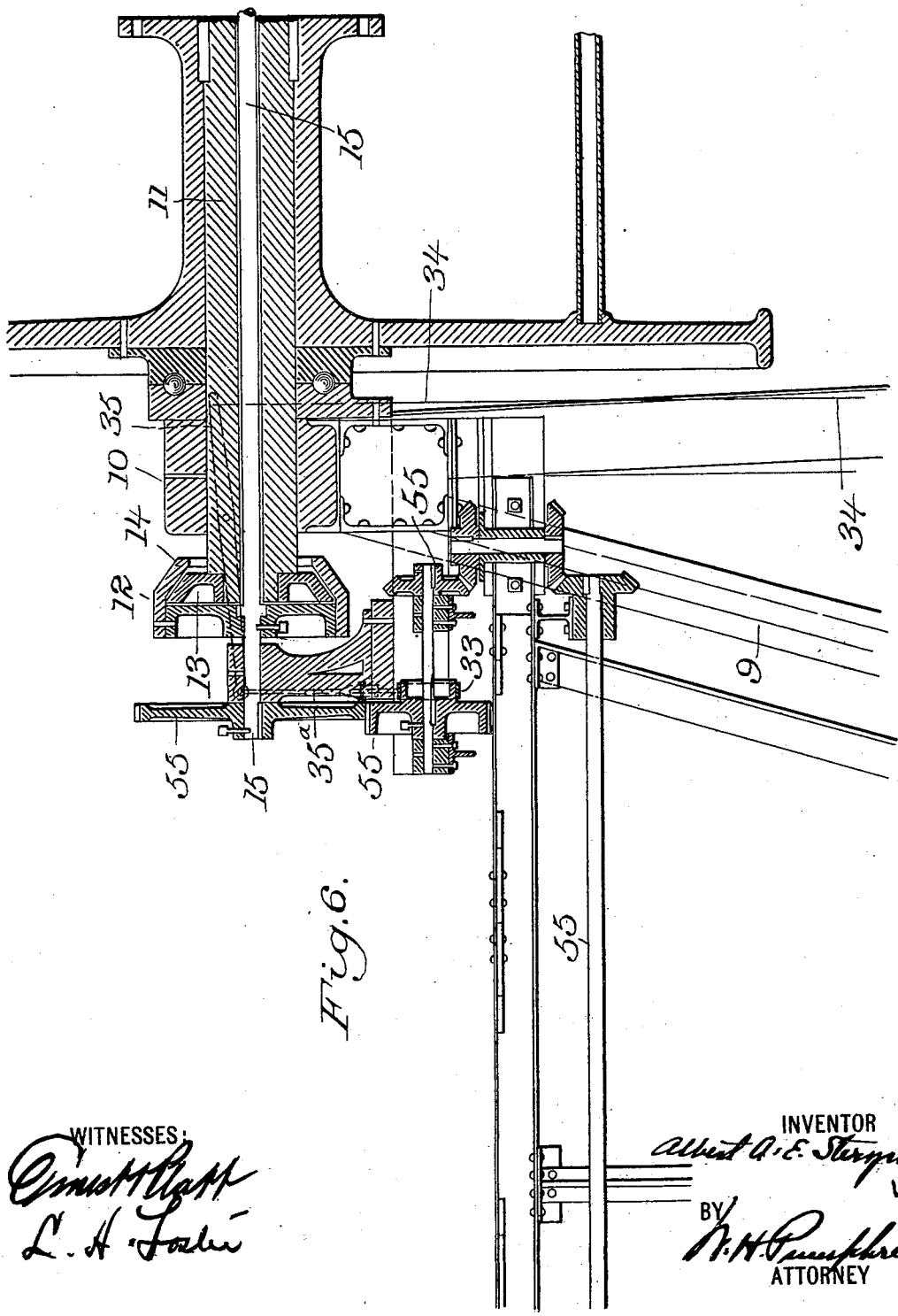

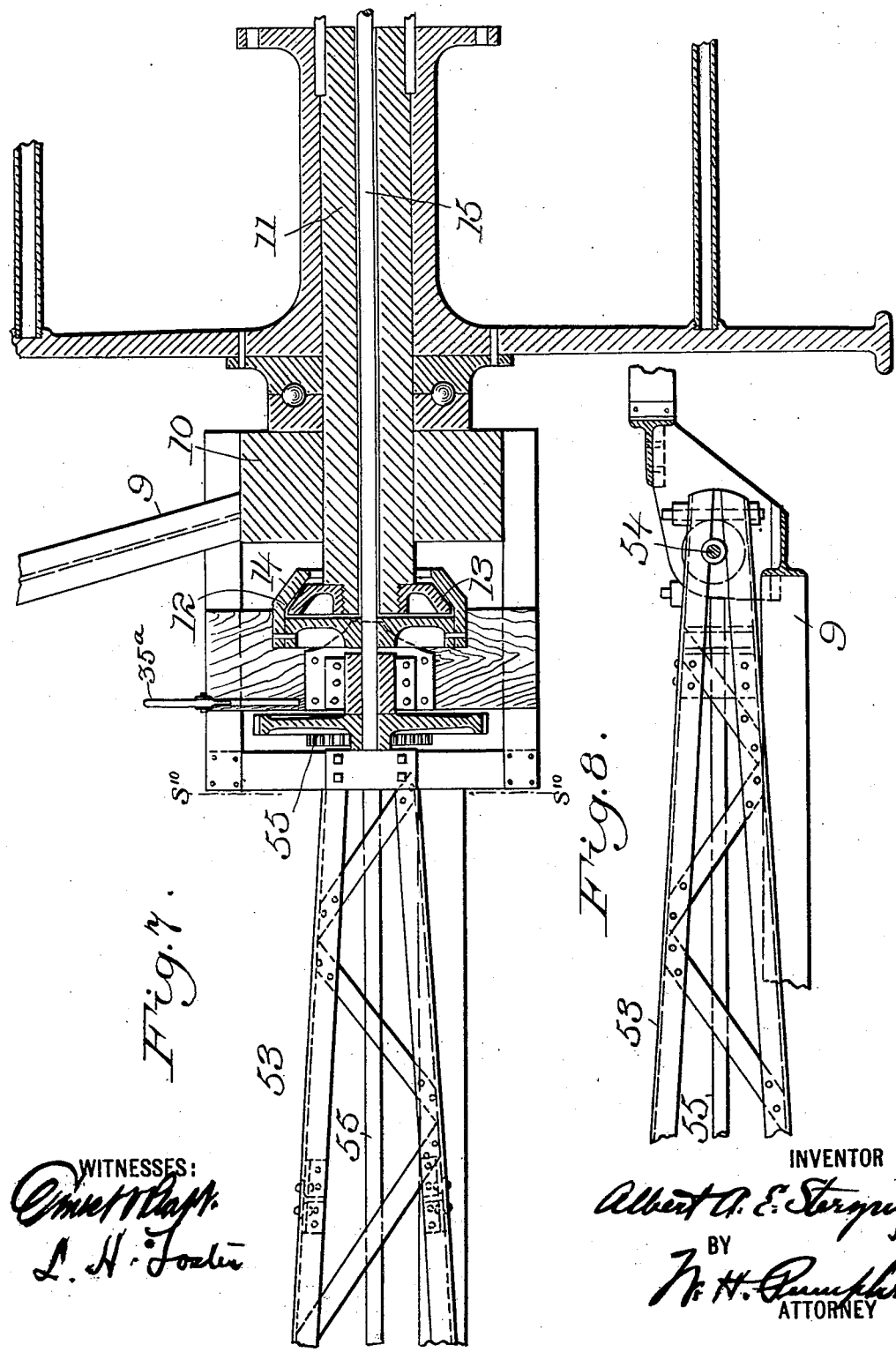

No. 677,747. Patented July 2, 1901.
A. A. E. STERZING.
WINDMILL.
(Application filed Aug. 2, 1898.)
(No Model.) 8 Sheets—Sheet 7.
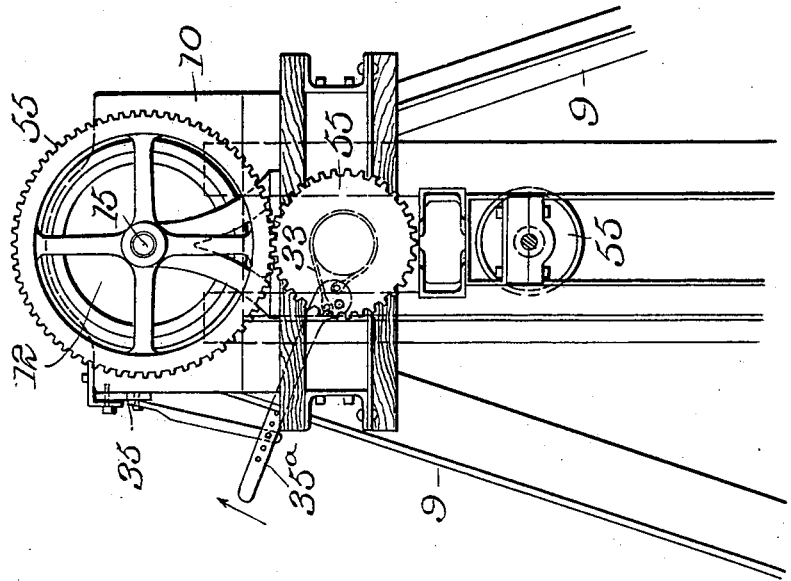
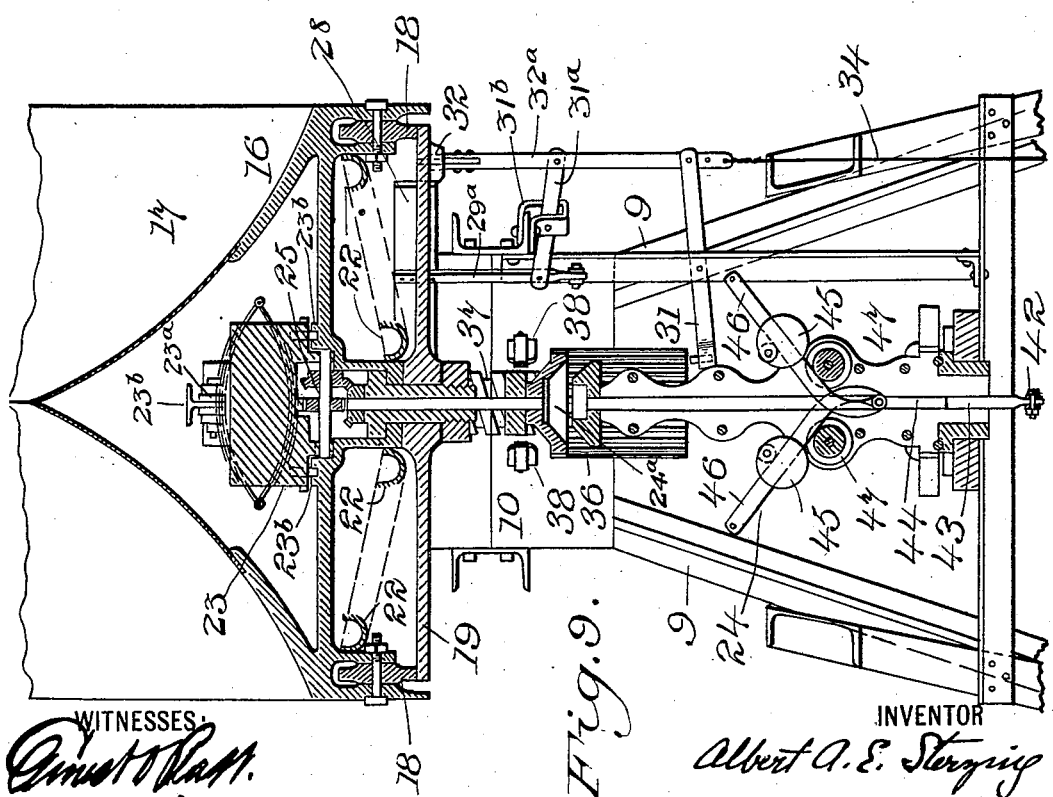
WITNESSES:
INVENTOR
Albert A. E. Sterzing
BY
W. H. Humphrey
ATTORNEY No. 677,747.  
A. A. E. STERZING.  
WINDMILL.  
(Application filed Aug. 2, 1898.)  
Patented July 2, 1901.

(No Model.)  
8 Sheets—Sheet 8.

WITNESSES:  
INVENTOR  
Albert A. E. Sterzing  
BY  
ATTORNEY

THE NORRIS PETERS CO., PHOTO-LITHO., WASHINGTON, D. C.

UNITED STATES PATENT OFFICE.

ALBERT AUGUST ERNEST STERZING, OF NEW YORK, N. Y.

WINDMILL.

SPECIFICATION forming part of Letters Patent No. 677,747, dated July 2, 1901.

Application filed August 2, 1898. Serial No. 687,496. (No model.)

*To all whom it may concern:*

Be it known that I, ALBERT AUGUST ERNEST STERZING, a subject of the Queen of Great Britain, and a resident of New York, in the county of New York and State of New York, have invented certain new and useful Improvements in Windmills, of which the following is a specification.

My invention relates generally to windmills; and it consists, specifically, in certain features of construction and combinations and arrangements of parts to be hereinafter described.

One embodiment of the invention is illustrated in the accompanying drawings, throughout the several views of which like figures indicate corresponding parts.

Figure 1:
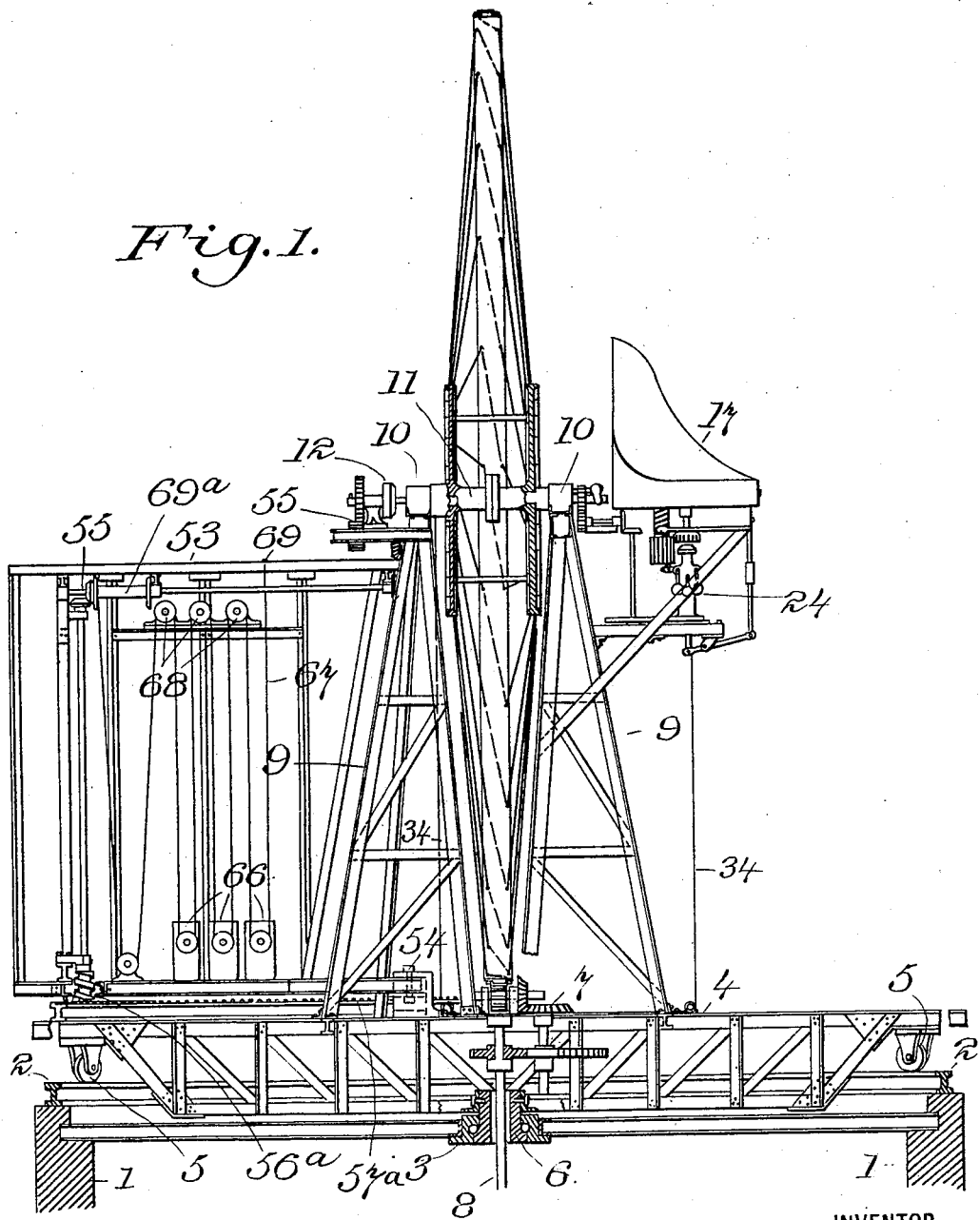
Figure 11:
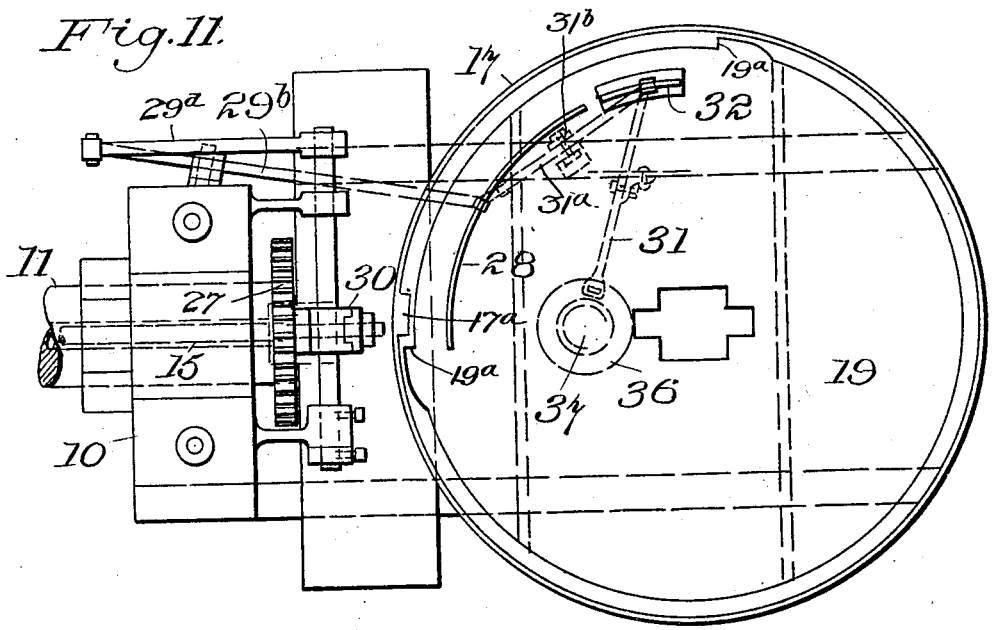
Figure 12:
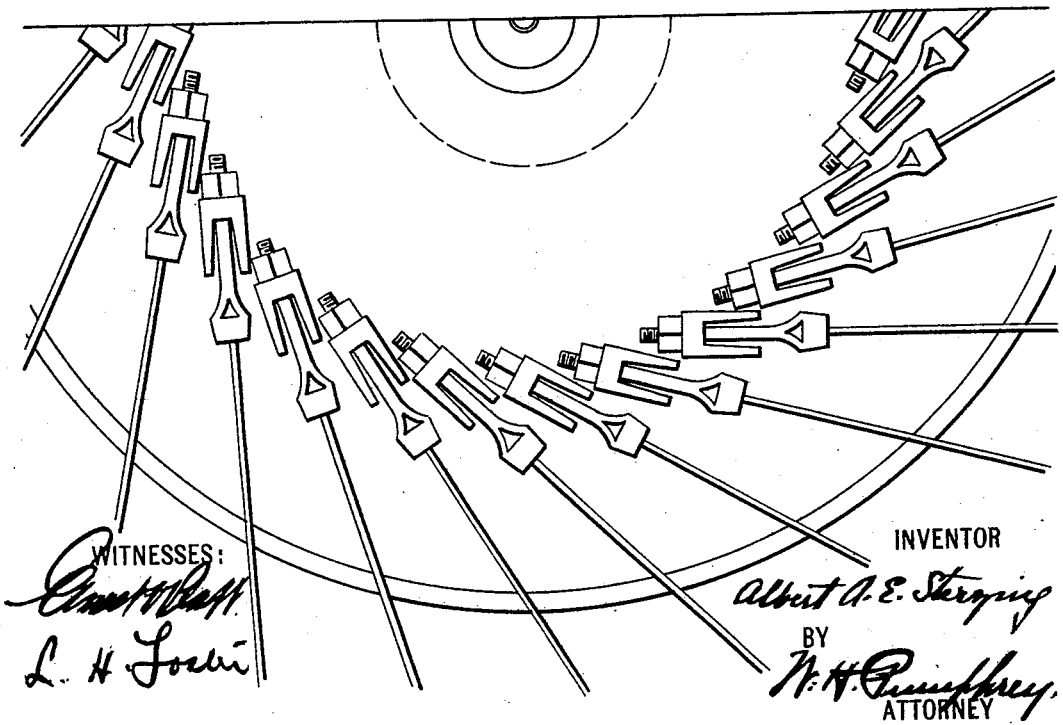

Referring to the drawings, Figure 1 is a view in side elevation, partly in section, of a windmill constructed in accordance with my invention. Fig. 2 is a front elevation, partly in section, of the same. Fig. 3 is a plan view of the rotating platform with the wind-wheel, &c., removed and showing the vane or tail and some of its operating-gear. Fig. 4 is a rear view in elevation of the vane or tail with its inclosing casing removed. Fig. 5 is a detail sectional view of the speed-governor and some of the coöperating mechanism. Fig. 5ᵃ is a detail view of the brake-operating toggles. Fig. 6 is a similar view of the friction-clutch and brake mechanism. Fig. 7 is a horizontal sectional view of the same. Fig. 8 is a similar view taken on a lower horizontal plane. Fig. 9 is a vertical sectional view taken on the line $s^9$ $s^9$ of Fig. 5. Fig. 10 is a similar view taken on the line $s^{10}$ $s^{10}$ of Fig. 7. Fig. 11 is a plan view of the table of the gravity-trip and clutch-shifting gear; and Fig. 12 is a fragmentary view in detail of the hub of the wind-wheel, showing manner of mounting the spokes, &c.

In the drawings, 1 represents a suitable foundation for a circular track 2, centrally within which and suitably supported by braces bearings 3 are provided.

A platform or table 4, mounted on the circular track, is provided with a series of rollers 5 5 to render it freely rotatable thereon. The platform is centered and sustained against upward pull or pressure by having a depending flanged sleeve 6 journaled in the bearings 3, above referred to.

Any suitable gearing 7 may be mounted upon the platform for transmitting power from the rim of the wind-wheel, which may be toothed through the shaft 8 to machinery of any sort.

9 represents the wheel-tower, comprising twin supports, each consisting of a number of uprights or standards carrying bearings 10 10 for the hollow wheel-shaft 11. These bearings, as shown in Fig. 1, are arranged in front and rear of the wheel, with the latter in perfect balance between them. In thus mounting the wheel all tendency of the wheel-shaft to bend or yield under excessive wind-pressure is obviated.

Referring to Figs. 6 and 7, 12 represents an automatic friction-clutch which connects the vane or tail with the wind-wheel—that is to say, the closing and opening of this clutch serves to throw the vane-shifting mechanism into and out of operation. When the clutch is open, as illustrated, the vane swings with the wind-wheel as the platform turns, but it is rendered incapable of independent movement under the influence of its contained actuating mechanism, as will be more fully described. When the clutch is closed, however, the vane-actuating mechanism is thereby connected with and driven by the wind-wheel and operates to shift the vane, wind up the motor for returning the same to its normal position, and throw the wheel out of the wind, in which position it remains until the speed of rotation is reduced to normal. This clutch consists of two members 13 and 14, provided with engaging conical surfaces. The interior member 13 is keyed or otherwise fixed upon the reduced end of the hollow wheel-shaft. The exterior member 14 is fixed upon to rotate and shift with the clutch-shaft 15, which latter extends through the hollow wheel-shaft and is movable in the direction of its length through mechanism to be later on described.

Ordinarily in the operation of a wind-wheel the regulation of the speed is effected through the action of a governor controlling the vane, and while such mechanism may serve to prevent excessive speed, &c., it fails to respond and its action is ineffective where the wind-pressure suddenly increases or comes in puffs. As shown in the drawings, a speed-governor is here employed in automatically controlling the shifting of the vane, but it is not directly connected with the same, there being interposed in the line of connections between these devices an automatic trip 16. This trip is designed to act independently under excessive wind-pressure and is operatively arranged to close the clutch either independently or in coöperation with the governor—that is to say, when the wind-pressure increases suddenly the trip operates independently, but where such increase is sufficiently gradual to allow the governor to respond the latter serves to operate the trip, and it in turn actuates the clutch. The trip comprises an inclosing casing 17, (see Figs. 1, 2, 5, and 9,) mounted to be freely movable in a horizontal plane upon rollers 18 18, which run over a circular table 19, the latter being suitably supported from the wheel-tower frame. The casing is provided with a lug 17ª, which travels between stops 19ª 19ª of the table, and thereby limits the rotary movement of the trip-casing. In horizontal section the upper or exposed portion of the casing is approximately triangular and presents to the wind two inclined diverging surfaces which are more or less concaved and is weighted at 20ª by an increased thickness of shell, and thereby normally sustained in an upright position against ordinary wind-pressure. The casing, in addition to its free movement about a vertical axis, has a limited rocking action or oscillation on trunnions 20, which latter are indicated by dotted lines in Fig. 5. Thus it will be seen that by reason of its peculiar shape the casing, in a manner similar to a weather-vane, will be at all times self-maintained in the wind and under a sudden increase of wind-pressure will be tripped or rocked on its trunnions. The last-mentioned movement is utilized to close the clutch; but as a mere dip of the casing would prove ineffective for this purpose it is necessary to maintain the casing in its adjusted position until the pressure of the wind decreases. This is accomplished through the employment of a series of movable spherical weights 21, lying in runways 22 22, &c., the inclination of which latter is suitably varied to cause the weights in shifting to move successively rather than collectively, thereby avoiding shock or strain upon the structure.

When the trip is actuated through the coöperation of the governor 24, its oscillation is positively controlled by a main shifting weight 23, connected by gearing 25 with the governor-clutch 24ª. This weight 23 is toothed along its under side for engagement with the gearing 25, connecting the weight with the governor-clutch, and is provided with rollers 23ª, running in guides or tracks 23ᵇ. Normally this weight is preferably centered or balanced with relation to the trunnions of the casing, thus permitting more or less freedom of movement of the latter when acting independently of the governor to close the main clutch. A train of gearing 27 serves to connect the hollow wheel-shaft with the governor, and when, therefore, the pressure of the wind increases sufficiently the governor-clutch will be closed and motion will be transmitted through the same to the gearing 25 to shift the main weight 23 toward the left or in the direction of the wind-wheel. This action results in rocking the casing toward the wind-wheel and causing the smaller weights to shift, thereby temporarily maintaining the casing in its adjusted position.

Referring to Figs. 5 and 9, 28 and 32 represent two depressible track-sections movable through openings in the table 19 and supported beneath the table by having depending extensions 29ª 32ª therefrom pivotally connected to an arm 31ª, which latter is pivotally hung in a bracket-support 31ᵇ, projecting from the tower-frame. These track-sections are designed to control the vane-clutch 13 14 above referred to, also the friction-band brake 33 of the vane-shifting gear. Normally the longer section 28 is elevated and projects through the opening in the table, while the short section 32 is proportionately depressed, and with these parts thus sustained the vane-clutch is open and the friction-brake applied. This relation is maintained until the trip acts, causing its spring-mounted wheel 28ª to depress the track-section 28, and thereupon the clutch is closed and the brake thrown off, as will be hereinafter more fully described.

The track-section 28 is operatively connected with the movable clutch member 14 through the depending track extension 29ª, levers 29ᵇ 29ᶜ, crank-arm 29ᵈ, rock-shaft 29ᵉ, and forked arm 30, engaging a loose sleeve upon the end of the clutch-shaft 15. When, therefore, this track-section is depressed, the shaft 15 is shifted toward the left, as viewed in Figs. 5 and 6, and the clutch is closed. Referring to Fig. 11, it will be seen that the track-section 28 is sufficiently long to allow for play of the clutch-trip casing under the action of the wind, but this movement is limited, as before stated, by the lug 17ª playing between the stops of the table.

The short track-section 32 is operatively connected with the brake-band 33 through the depending track extension 32ª, cable 34, and levers 35 35ª, and as the track-sections are shifted from their normal position the free end of the lever 35ª is moved in the direction of the arrow (see Fig. 10) to loosen the friction-band and allow the gearing to run free. This brake is applied through the weight of the long arm of the brake-lever 35ª in causing the friction-band to grip the drum.

When the main clutch is closed, the vane will be shifted into the wind, thereby throwing the wheel out, and in consequence causing a reduction in the speed of rotation of the latter and the subsequent opening of the governor-clutch above referred to.

The upper member of the governor-clutch is geared with a toothed cylindrical weight 36, which latter being thus driven travels upward upon a screw-shaft 37, depending from the circular table 19. The weight is self-returning and in its downward movement coöperates, in connection with the springs of trip-wheel 28$^a$, to restore the casing to its normal position by reversing the gearing 25, and thereby shifting the weight 23 toward the right, as viewed in Fig. 5. As the trip-casing resumes its normal position the small spherical weights shift and pressure is removed from the track-sections, which become self-adjusted into operative relation with the trip-wheel 28$^a$, and at the same time the vane-clutch is opened and the friction-band brake applied.

It is desirable to temporarily retain the weight 36 elevated after it has moved upward—that is to say, after the release of the governor-clutch—for the purpose of preventing the sudden return of the wheel into the wind, and to accomplish this a light friction-brake 38 is employed, it being in the form of duplicate brake-shoes, carried by tongs, pivoted at 39, and operated through toggles 40, levers 41 42, and plunger-rod 43, the latter being engaged by the vertically-movable governor-shaft 44.

The governor here illustrated is the ordinary ball type and, if desired, may be provided with an additional pair of weights 45, sliding upon pivoted arms 46, movable over pulleys 47, as illustrated in Fig. 9.

53 represents an adjustable vane by means of which the wheel is held in or caused to swing out of the wind, according to the speed of rotation, and comprises a frame partially or wholly incased by a light-weight covering of sheet metal or other material and mounted to turn about the pivotal center 54 under the action of a train of gearing 55, driven from the main clutch. This gearing terminates in an intermeshing worm and worm-wheel 56 56$^a$, through which motion is transmitted to a toothed pinion 57, working in a curved rack 57$^a$. To return the vane to its normal position after being shifted, a motor in the form of a series of weights 66 is employed. These weights are carried by a continuous cable 67, running over pulleys 68 and having one end secured to the frame at 69 and the other being attached to a drum 69$^a$, formed in part with a worm-wheel of the gearing above referred to. Thus it will be apparent that as the gearing is operated to shift the vane the drum will take up the cable, thereby raising the weights, and upon the release of the main clutch these weights will descend unless checked by the friction-brake and reverse the motion of the gearing, thus bringing the vane back to its normal position. The worm-gearing employed serves to lock the vane against being shifted independently of the carrying-platform by wind-pressure.

The wind-wheel is formed by a series of sails of sheet metal or canvas carried by rods or cables secured at their outer ends to the rim of the wheel, while their inner ends rest in slots of the hub-flanges and are secured by adjustable eyebolts in brackets arranged about the hub of the wheel. To obtain high efficiency, these sails are given more or less pitch or twist by the arrangement of the cables or rods, as indicated by the dotted lines in Fig. 1 of the drawings.

The operation may be described as follows: Owing to the peculiar form of wheel employed and to the freedom of movement of the main platform the entire structure will readily swing or veer to bring the wheel into the wind, and when thus adjusted the wheel will run free under the influence of the wind until its speed of rotation becomes excessive, and at such times the governing mechanism, acting automatically, regulates it by closing the main clutch, either through the direct action of the trip or indirectly by the governor, thereby throwing the vane-gearing into operation, which results in shifting the vane into the wind and throwing the wheel out. Assuming that the speed of rotation of the wind-wheel has gradually increased until the governor 24, driven through the train 27, has been speeded up to a point where it is about to act, the regulating mechanism becomes effective by the action of the governor in closing its clutch 24$^a$. The upper member of this clutch being operatively connected with the trip-weight 23 through the gearing 25 and directly geared with the cylindrical weight 36 at once imparts motion to the same, causing the trip-weight 23 to move toward the left, as viewed in Fig. 5, and the cylindrical weight 36 to ascend the screw-shaft 37. The screw-shaft is provided with a high-pitch thread sufficiently coarse to permit antifriction-rollers or ball-bearings carried by the weight to work therein, as indicated at 36$^a$ 36$^a$. As the casing 17, &c., is tripped by its weight 23 shifting under the action of the governor-driven gearing, the spring-mounted wheel 28$^a$ depresses the long track-section 28, which latter in moving downward causes the short track-section 32 to become proportionately elevated through the connecting-lever extensions, &c., 32$^a$ 29$^a$ 31$^a$, and these parts are held thus relatively adjusted by the trip through the medium of its various movable weights 21 23 in shifting toward the left or depressed side of the casing, as has been previously described. In reversing the position of the track-sections the main clutch is closed through the coöperation of the various levers, &c., 29$^a$, 29$^b$, 29$^c$, 29$^d$, and 30, connecting the longer track-section 28$^a$ with the clutch-shaft 15, which latter becomes thereby shifted in the direction of its length, as above described, to bring the clutch members 13 14 into engagement. At the same time the rise of the short track-section serves, by reason of its connection through the parts 32ª, 34, and 35 with the brake-lever 35ª, to release the brake-band 33. The vane driving-gear being now free and operatively connected with the wind-wheel, motion is imparted through the same to rotate the pinion 57, mounted upon the vane-casing (see Figs. 3 and 4) and meshing with a curved rack or quadrant 57ª, carried by the platform. Under the action of this gearing the vane is adjusted from its normal position—*i. e.*, at right angles to the plane or face of the wind-wheel—and moves into the wind and continues in this direction until the wheel has shifted out of the wind and its speed becomes properly reduced. The drum 69ª, forming part of the motor for automatically returning the vane to its normal position, is operatively connected and driven by the vane-gearing during its operation, and in being thus driven winds up the cable 67 and elevates the several weights 66 66 66, &c. As above described, the adjustment of the vane causes the wheel to move out of the wind, but owing to the peculiar shape of the trip-casing the latter device, acting in the manner of a weather-vane, remains in the wind, and in consequence the rotation of the trip-wheel 28ª to the track-sections changes, in that these track-sections, together with the entire lower structure, partake of the movement of the wind-wheel in shifting and the longer track-section passes under the trip-wheel, which latter then engages and depresses the short section, applies the brake 33 in the manner previously pointed out, and opens the main clutch, thereby preventing the reversal of the vane-gearing and maintaining the wheel out of the wind. As the speed of the wheel is reduced the governor 24 will act to open its clutch 24ª, and as the clutch-shaft 44 (see Fig. 5) moves downward it engages a vertically-movable plunger-rod 43, and through the rocker-arm 42, rod 41, and toggles 40 causes the brake-shoes 38 38 to grip the cylindrical weight 36 and maintain it temporarily in an elevated position upon its screw-shaft, or until the pressure of the wind has become sufficiently reduced to allow the springs of trip-wheel 28ª to act in lifting the depressed side of the casing, and as this is effected the several small weights 21 21, &c., shift, causing the trip to resume its normal position. Pressure having been removed from the track-sections, the short section 32 remains depressed as the wheel 28ª is carried upward out of engagement therewith, owing to the greater weight of the extension 32ª, cable 34, &c., as compared to section 28, and the brake 33 remains applied. The release of this brake is effected by the descent of the cylindrical weight 36, which though somewhat checked by the engaging brake-shoes 38 38 travels downward and through its engagement with the upper member of the governor-clutch reverses the gearing 25 and restores the trip-weight to its normal position. At or near the lower extremity of its movement the weight 36 engages the free end of a lever 31, connecting with the track extension 32ª, and rocks the same, thereby pulling upon the cable 34 and releasing the band-brake. The vane-gearing being now free to operate the several weights act to reverse the travel of the vane, which again moves into its normal position at right angles to the plane of the wind-wheel, and the latter swings into the wind.

Having therefore described my invention, I claim—

1. In a windmill, the combination of the wind-wheel, the vane, gearing connecting the wheel and vane, a clutch forming part of said gearing, a governor, an automatic trip and means whereby the trip controls the clutch through the action of the governor or independently under excessive wind-pressure.

2. The combination of the wind-wheel, a vane geared to the wheel, a motor mounted upon the vane and having its winding mechanism driven from the wind-wheel, a clutch forming part of the gearing between the wheel and vane, a governor, an automatic trip and means whereby the trip controls the clutch through the action of the governor or independently under excessive wind-pressure.

3. The combination with a wind-wheel, of a vane geared to the wheel, means by which the vane is rendered self-returning, a clutch forming part of the gearing between the wheel and vane, a speed-governor, an automatic trip, and means whereby the trip controls the clutch through the action of the governor or independently under the influence of excessive wind-pressure, as specified.

4. In combination, a wind-wheel rotatable about a horizontal axis, a carrying-platform rotatable about a vertical axis, a vane, means for returning the vane to its normal position, gearing connecting the wheel and vane, a clutch forming part of said gearing, an automatic trip controlling the clutch, together with a speed-governor coöperating therewith, and a brake for the vane-gearing controlled by the automatic trip, as specified.

Signed at New York, in the county of New York and State of New York, this 9th day of July, A. D. 1898.

ALBERT AUGUST ERNEST STERZING.

Witnesses:
ERNEST V. PLATT,
L. H. FOSTER.